(12) United States Patent
Rhodes, Jr. et al.

(10) Patent No.: US 6,273,810 B1
(45) Date of Patent: Aug. 14, 2001

(54) INFLATABLE AIR CELL HAVING COMBINED PNEUMATICALLY ADJUSTED OCCUPANT SUPPORT AND THERMAL CONDITIONING

(75) Inventors: Richard D. Rhodes, Jr., Somersworth, NH (US); Scott J. Moran, Winchester, MA (US); Stephen Burt, Reading (GB)

(73) Assignee: McCord Winn Textron Inc., Manchester, NH (US)

( * ) Notice: Subject to any disclaimer, the term of this patent is extended or adjusted under 35 U.S.C. 154(b) by 0 days.

(21) Appl. No.: 09/393,606

(22) Filed: Sep. 10, 1999

(51) Int. Cl.⁷ .............................. B60N 2/56; A47C 27/08
(52) U.S. Cl. ...................... 454/120; 6/652.2; 6/654; 6/655.3; 297/180.13; 297/452.47
(58) Field of Search ..................... 454/120, 907; 5/652.2, 654, 655.3; 297/180.13, 452.42, 452.43, 452.46, 452.47, DIG. 8

(56) References Cited

U.S. PATENT DOCUMENTS

| | | |
|---|---|---|
| 3,127,931 * | 4/1964 | Johnson ............................... 454/120 |
| 4,006,604 | 2/1977 | Seff . |
| 4,712,832 * | 12/1987 | Antolini et al. ................. 454/120 X |
| 4,853,992 | 8/1989 | Yu . |
| 5,016,302 | 5/1991 | Yu . |
| 5,379,471 * | 1/1995 | Holdredge ............................ 5/654 X |
| 5,524,439 | 6/1996 | Gallup et al. . |
| 5,597,200 | 1/1997 | Gregory et al. . |
| 5,626,021 | 5/1997 | Karunasiri et al. . |
| 5,715,695 | 2/1998 | Lord . |
| 5,800,480 | 9/1998 | Augustine et al. . |
| 5,921,314 | 7/1999 | Schuller et al. . |

* cited by examiner

*Primary Examiner*—Harold Joyce
(74) *Attorney, Agent, or Firm*—Reising, Ethington, Barnes, Kisselle, Learman & McCulloch, P.C.

(57) ABSTRACT

An air cell support system for vehicle seat and mattress applications includes an air cell constructed from facing sheets of flexible material that are sealed along their marginal edges. One of the sheets is impermeable and the other of the sheets is perforated to direct air from the air cell for ventilating an occupant support surface while providing a source of pressure for inflating the air cell.

8 Claims, 7 Drawing Sheets

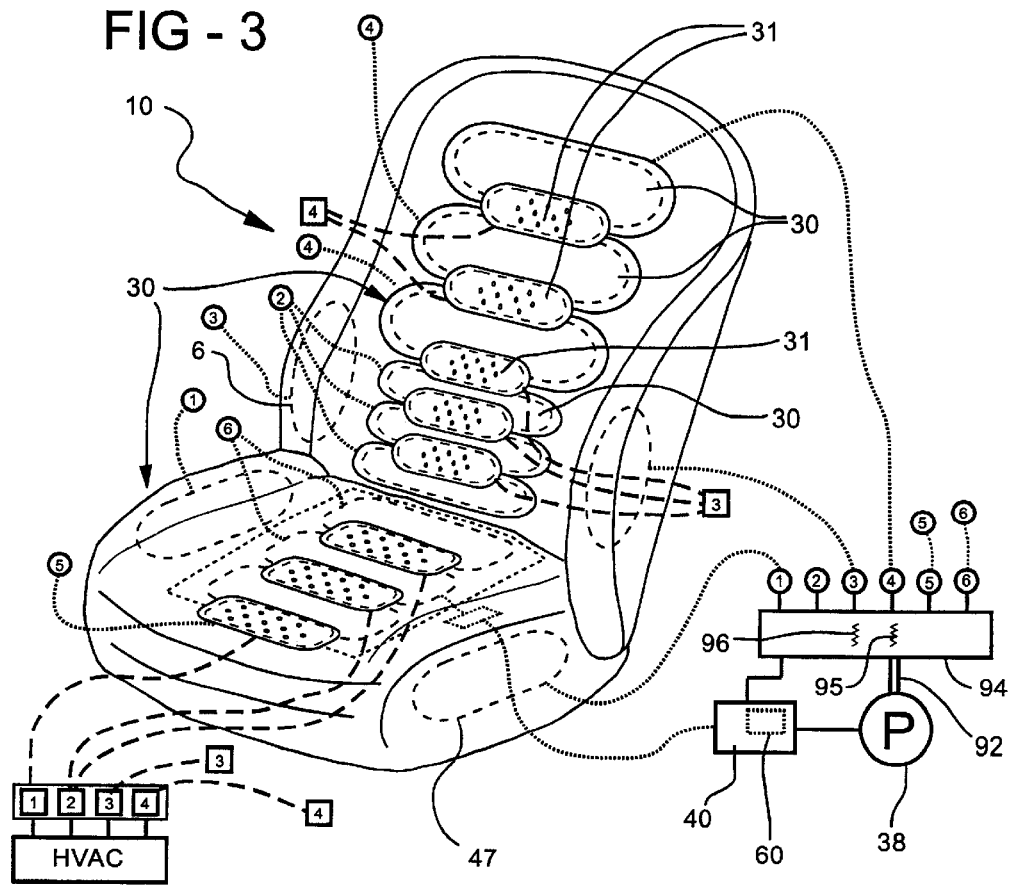
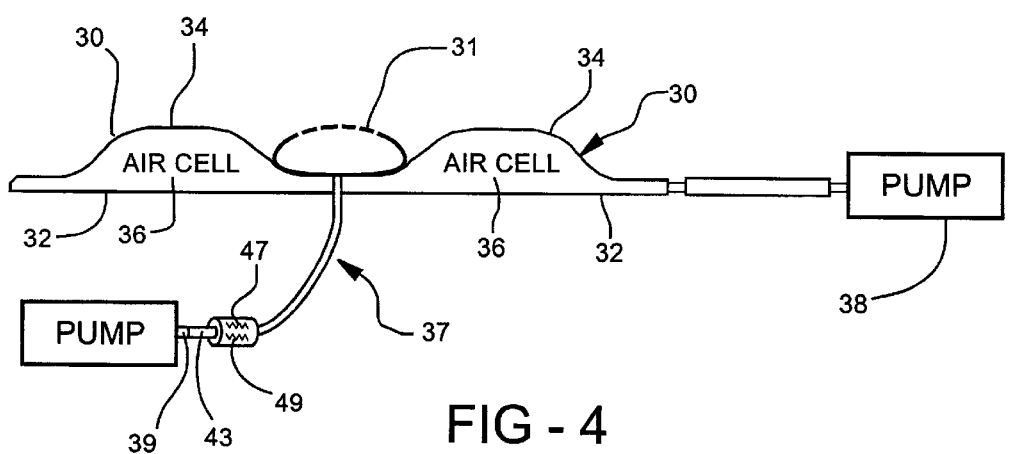

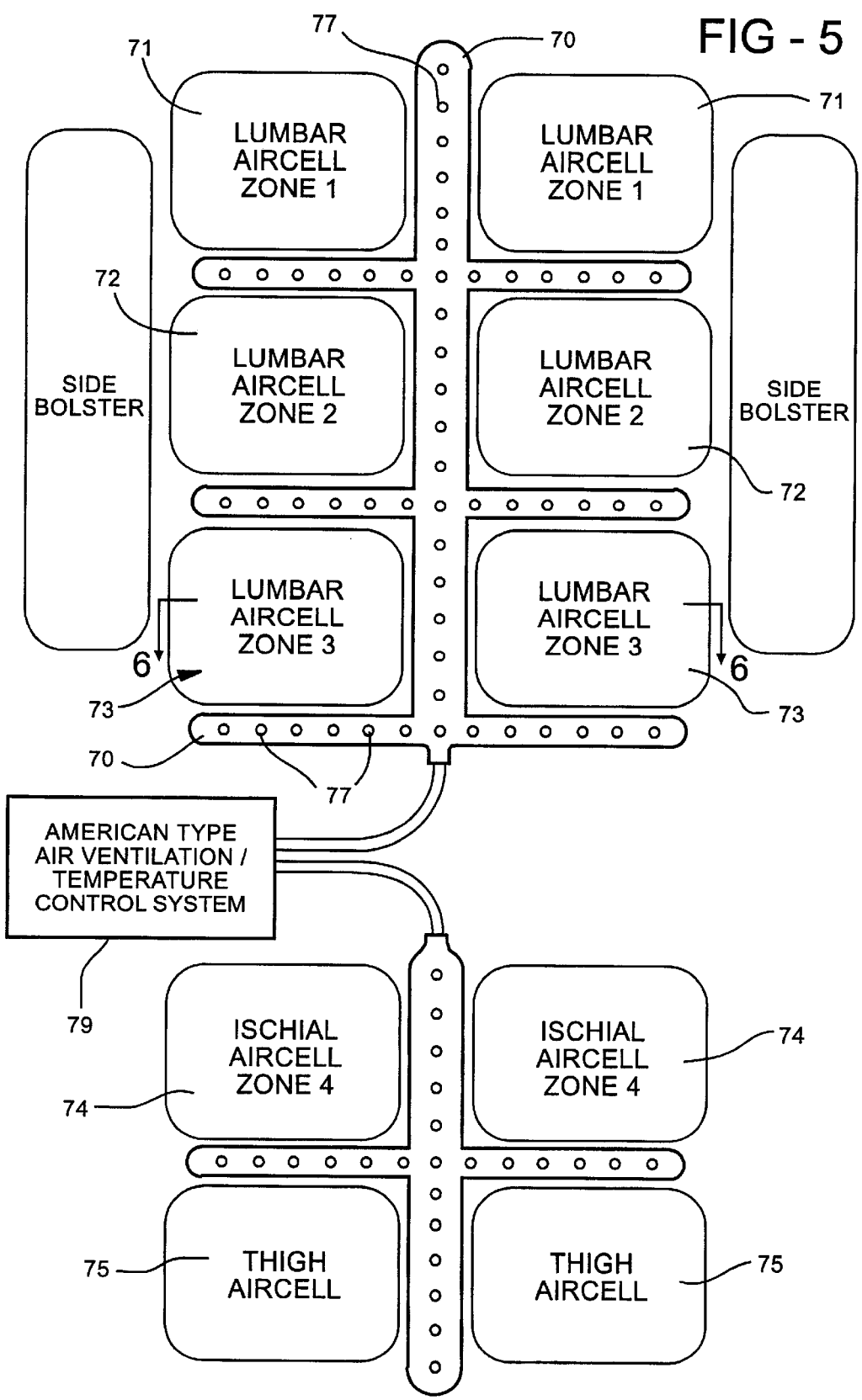

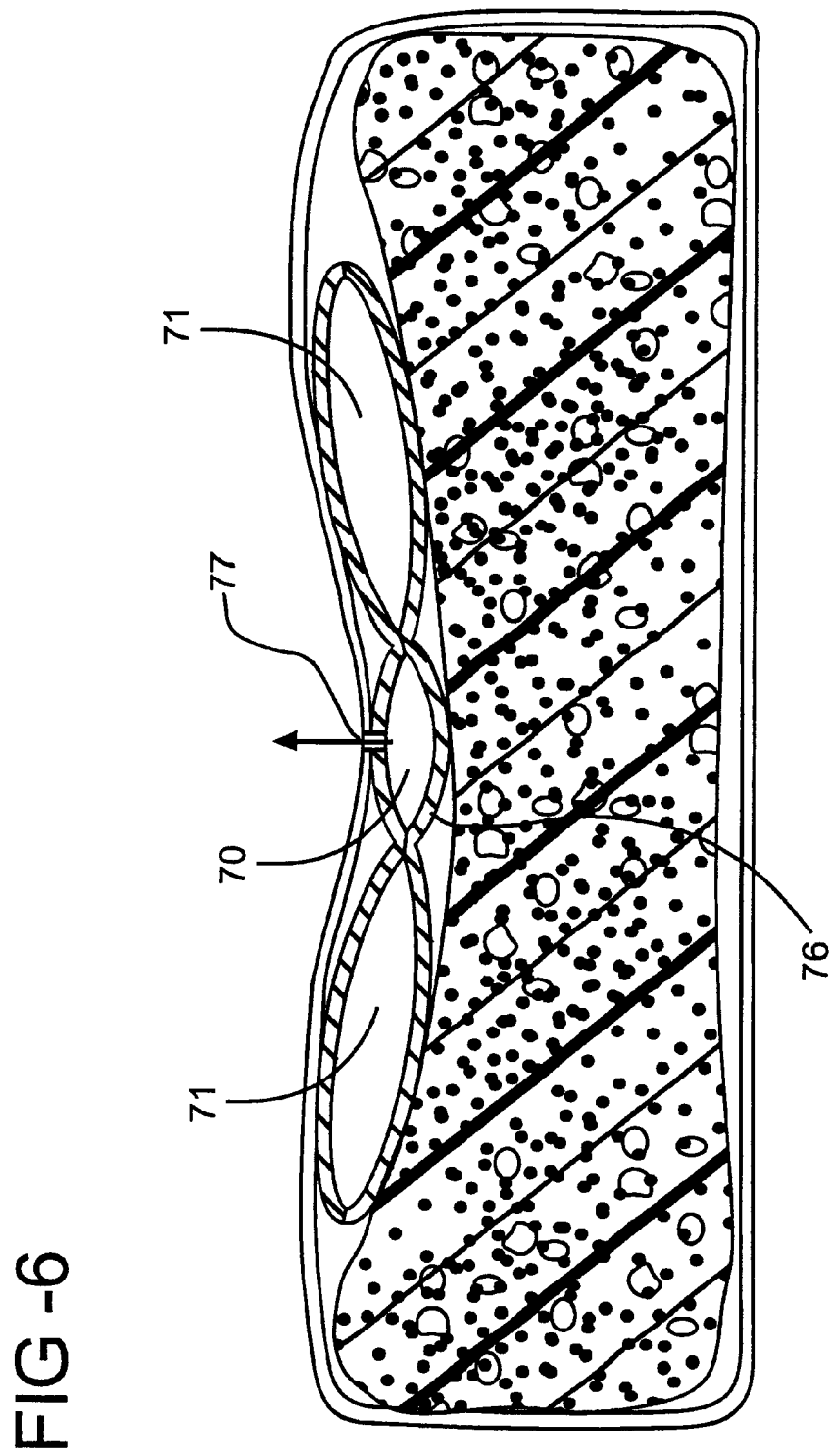

INFLATABLE AIR CELL HAVING COMBINED PNEUMATICALLY ADJUSTED OCCUPANT SUPPORT AND THERMAL CONDITIONING

This invention relates generally to inflatable air cell systems for occupant support in seating and mattress applications and, more particularly, to the provision of a perforated wall in one or more air cells in a system for metered flow of fluid from the air cell to either heat or cool the seating or mattress application.

BACKGROUND OF THE INVENTION

Air cells, particularly for pneumatically adjustable occupant support systems in seating or other support applications, are frequently constructed from facing layers of a flexible, air-impermeable material such as thermoplastic urethane, fabric reinforced polyvinylchloride, and other plastic film materials, that are dielectrically sealed or otherwise joined about their marginal edges to enclose an interior inflatable air chamber. An air tube connected to the air cells that in turn is coupled to an airflow control system for inflation and deflation of the air cell.

Traditionally, such air cells are inflated by either pressurizing or deflating one or more of the cells in accordance with a predetermined control algorithm for providing a desired user comfort level. Alternatively, the pressure can be controlled by a pump and switch. In such arrangements the individual air cells have been located in desired seating configurations including the lumbar region and ischial regions of a user. In such seats a further practice has been to perforate an overlying trim material so that the seat cushion or seat back support surfaces will tend to breath. Leather or a suitable plastic material such as PVC, urethane, polyolefins or the like materials have been provided to give a level of so called breathability.

While suitable for their intended purpose such arrangements neither cool or heat a seat to meet desired uniform thermal comfort considerations. Other seating arrangements are known that will heat or cool a seat.

Examples of such arrangements are set-forth in the following listed patents.

| U.S. Pat. No. | Inventor |
| --- | --- |
| 5,016,302 | Yu |
| 5,524,439 | Gallup et al. |
| 5,597,200 | Gregory et al. |
| 5,626,021 | Karunasiri et al. |
| 5,715,695 | Lord |
| 5,800,480 | Augustine et al. |

None of the aforesaid arrangements, however, provide for heating or cooling the fluid and also controlling the pressurization in known pneumatic support systems that utilize one or more air cells as a means for supporting an occupant and operable to vary the pressure in one or more the air cells to provide individual occupant comfort.

SUMMARY OF THE INVENTION

The present invention is directed to an air cell arrangement wherein the fluid supplied to the air cells provides both thermal conditioning and pressure control of the pressure medium for inflating the air cell arrangement to a desired comfort level while overcoming or greatly minimizing the objections of how to control the temperature of a covering material and to avoid the need for installation of heaters or coolers within the confines of seating and other occupant supports as associated with traditional seating and occupant support arrangements.

An air cell system according to the invention for occupant support such as vehicle seating and mattress applications includes an inflatable pressure adjustable air cell constructed from facing sheets of flexible, air-impermeable cell material sealed along their adjoining marginal edges. An upper surface of one or more of the air cells is perforated to provide leakage of air from the air cell during inflation thereof for thermally conditioning the body contacting surface of the vehicle seat or other seating or mattress application.

The perforated surface of the air cell advantageously simplifies and improves the flow of conditioned air into the supporting surface of a vehicle seat or other seat support or mattress application.

Since the support surface conforms to the occupant support thereon the provision of a perforated layer therein to leak air through the support surface of the seat combines both a pressure adjusted shape for supporting an occupant while directing conditioned ventilating air against such occupant so as to optimize both support and heating/cooling of a vehicle seat or the like.

A feature of the invention is to provide such combined pressure and thermal control in an air cell comprised of two layers wherein the top layer is perforated.

A further feature is to provide a first set of air cells with imperforate walls and a supply tube connected to a pneumatic adjustable system for controlling the pressure in one or more of the first set of air cells for providing primary occupant support and to provide a second set of air cells having a perforated layer thereon to leak conditioning medium through the support surface of an occupant support structure and wherein the second set of air cells is supported on the first set to provide supplemental occupant support while providing ventilating fluid to cause air movement to provide cooling or heating and to evaporate occupant perspiration.

A further feature is to provide such combined pressure support and thermal control in an air cell including two sealed layers and a third top layer having air flow perforations therein.

A still further feature is to provide such pressure support and thermal control in a pneumatic controlled pressure adjustable air cell support comfort system wherein preselected air cells are formed from imperforate layers and wherein a second set of cells are perforated to provide separate thermal conditioning of an occupant support.

Yet another feature of the invention is to provide an air cell having a combined pressure support and temperature conditioning capability and wherein the air cell is filled with reticulated foam to provide secondary support and to assure air flow patterns (either by pressure flow out or evacuation flow in) through a perforated layer of the air cells for directing heating and cooling medium to an occupant supported thereon.

Still another feature of the invention is to provide such an air cell pressure support and thermal conditioning system wherein the pressure for occupant support is provided by a first pumping system and wherein the fluid flow for heating and cooling medium is provided by a second pumping system.

Still another feature of the invention is to provide such air cells for occupant support and heating and cooling wherein conditioned air is evacuated e.g., drawn from the surface of the seat system and discharged through the surface of the occupant support.

Still another feature of the invention is to provide such support and conditioning systems wherein the conditioned air is supplied an outlet from a vehicle HVAC system and is discharged through the surface of the seat system.

DRAWINGS

A presently preferred embodiment of the invention is disclosed in the following description, and in the accompanying drawings, wherein:

FIG. 3 is a view like FIG. 1 including a primary air cell system for supporting an occupant and a secondary air cell system for providing combined occupant support and thermal control;

FIG. 4 is a sectional view taken along the line 4—4 in FIG. 3 looking in the direction of the arrows;

FIG. 5 is a plan view of another embodiment of the invention shown in association with a pneumatic comfort control system for occupant support;

FIG. 6 is a transverse cross-sectional view taken along line 6—6 of FIG. 4.

DETAILED DESCRIPTION

Figure 1:
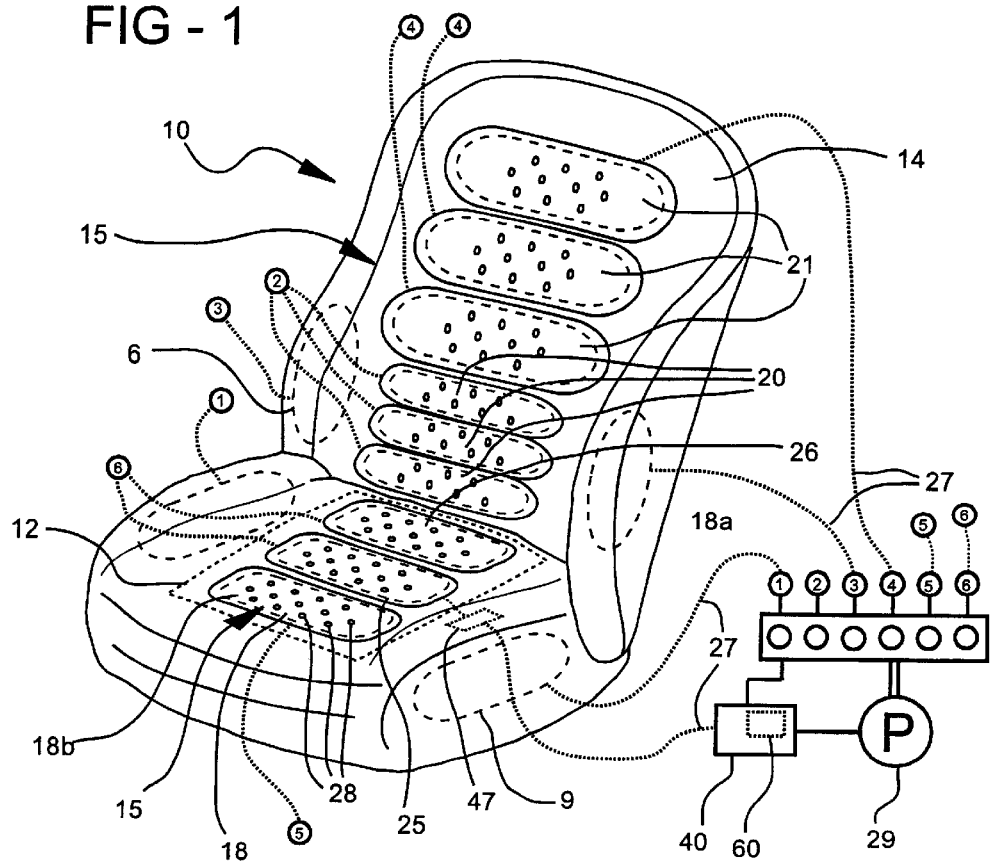
FIG. 1 is a perspective view of a vehicle seat embodying an air cell system of the invention.

Referring now more particularly to the drawings, there is shown in FIG. 1 a vehicle seat 10 having a generally horizontal seat rest portion 12 and an upright back rest portion 14 that is coupled to and projects upwardly from the seat rest portion 12 in conventional manner to support an occupant in a seated position on the seat 10.

The seat 10 is provided with an inflatable air cell system 15 according to the invention which includes one or more inflatable air cell(s) 18,20 mounted at preselected location(s) within the seat 10, preferably at least on the ischial region wherein air cells 18 are shown in FIG. 1 and at the lower back or lumbar region of the backrest 14 wherein the air cells 20 are shown. It should be understood that such locations are merely representative and the air cells can be placed in other seating locations such as bolsters, thorax regions at air cells 21 and head rest regions (not shown). Furthermore, such air cells can be found on other occupant supports such as mattresses and beds at spaced transversely disposed points thereon or where ever occupant support and cooling/heating is desired.

Figure 2:
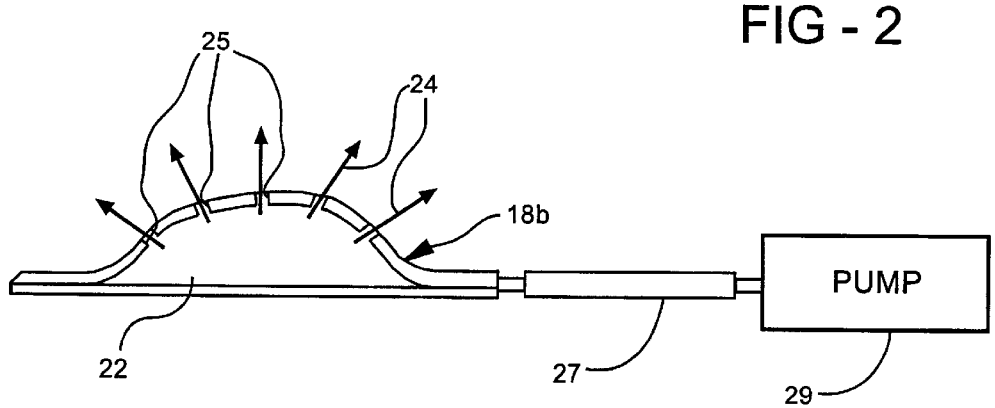
FIG. 2 is a cross-sectional view taken along the line 2—2 of FIG. 1 looking in the direction of the arrows.

As shown in FIG. 2, each air cell 18,20 is constructed from two sheets or layers 22, 24 of flexible plastic material, such as plastics, fabrics, or any other of the materials commonly used to construct inflatable air cells for connection by tubes 27 to a pump 29. The sheet 20 is imperforate and the sheet 22 is perforated at 25 for flow of thermal conditioning air (heated, cooled or ambient) for either heating or cooling the seat surface. Flow through the perforations provides ventilating fluid to cause air movement at the occupant support surface and such movement in part serves to evaporate occupant perspiration.

As shown in FIG. 1 at air cell 18a, the perforations 25 can be formed as slits 26. Alternatively, as shown at air cell 18b in FIG. 1, the perforations are can be holes 28. The holes 28 can be formed by laser, needle or other perforation methods.

In the embodiment of FIGS. 3 and 4 a first set of air cells 30 are constructed from two sheets or layers 32, 34 of flexible air cell material, such as plastics, fabrics, or any other of the materials commonly used to construct inflatable air cells. The sheets 32, 34 are both imperforate and form an air cell cavity 36. A second set of air cells 31 are supported by the first set of air cells 30. These cells have a perforated top layer 33 that will direct heating or cooling fluid to the occupant and serve as a supplemental support.

In FIG. 4 a further embodiment is shown of a diagrammatic representation of a seat comfort adjustment system 37 including air cell support and thermal conditioning wherein the pressure for occupant support is provided by a first pumping system 38 and wherein the fluid flow for heating and cooling is provided a second pumping (or blower) system 39.

First air cells 30 are provided that are connected to the seat comfort adjustment system 37 including the first pumping system 38. These air cells 30 do not provide heating or cooling but provide the primary occupant support. Additional air cells 33 are arranged between and are supported on the air cells 30 and the air cells 33 are connected to the second pumping system 39 independent of the first pumping system 38. In such case the source of fluid can for example include a pump connected by a conduit 43 across a suitable control valve arrangement 45 of a type to be described and wherein the conduit 43 can be connected to a cavity in which is located a heater 47 or a cold source 49 such as an evaporator coil of a refrigerant system or a thermoelectric device that can be either operated as a heater or a cooler depending upon the electrical connections there across. Alternatively, a source of ambient air can be used rather than cooling (which can be harmful, in excess, to the back).

In the embodiment of FIGS. 1 and 2 and FIG. 3, the air cells 18, 20, 21, 30 and 31 are connected via suitable tubing to a controller 40 for a pneumatic seating comfort adjustment system of the type set-forth in copending U.S. patent application Ser. No. 08/808,511 incorporated herein by reference.

The controller has a manifold 42 comprising a housing 42 enclosing a chamber 42a constructed with multiple outlet ports 44 for connecting the chamber 42a to the inlet/outlet tubes of each individual cell or regional group of cells. Each outlet port 44 is provided with an outlet valve 46 for controlling the flow of fluid to and from the air cells. In this embodiment, the sensor is a pressure sensing transducer 47 that is operatively connected in the manifold to sense the pressure in the manifold chamber 42a and generate a signal indicative thereof. Chamber 42a is also constructed with a single inlet port 48 which is connected to a feed tube 50 to receive pressurized fluid, in this case air, from a pump 52 corresponding to either the pump 38 or the pump 39. Pump 52 has a pump motor 54 connected to a pump drive 56 that is operated in response to air cell pressure under the control of microcomputer 60.

A supply valve 62 is provided in feed tube 50 to control the flow of pressurized fluid to the manifold. The manifold can be molded of a high strength plastic or rubber material or other suitable material. The plastic material arrangement can have many of its components integrally molded therein. It is preferred that it be as compact and lightweight as possible. However, the invention can be configured with other than lightweight components and other than with integral components. A common bleed or exhaust valve 64 is provided to selectively release pressure from the manifold chamber 43 through venting port 66. The pressure in chamber 43 can therefore be adjusted by either actuating pump 52 or bleed valve 64.

Figure 8:
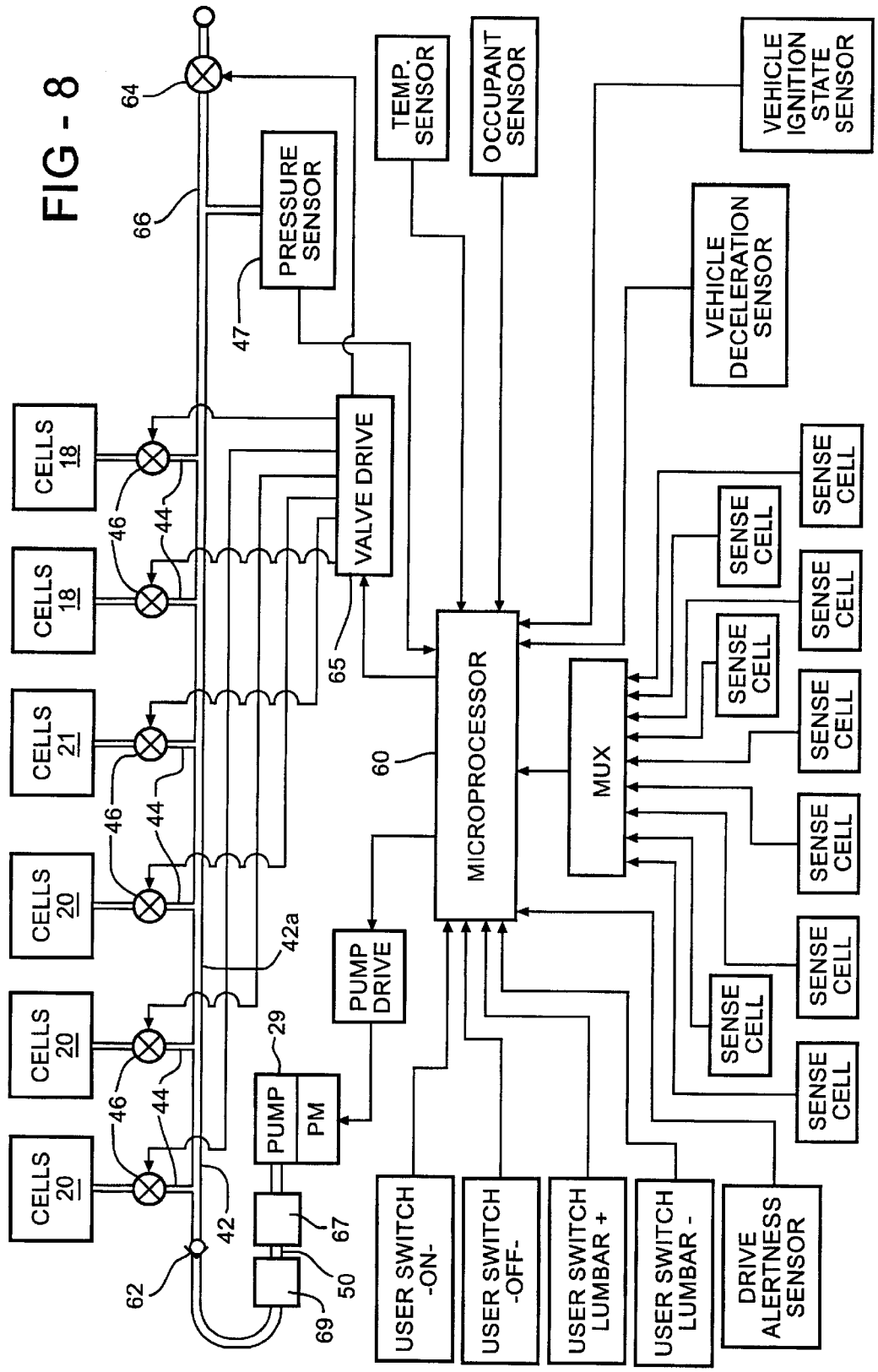
FIG. 8 is a schematic view of a controller for controlling the control valve of FIG. 7.

As shown in the diagrammatic control circuit of FIG. 8, valves 46 are actuated by an electrical signal from a valve drive 65 and are designed for low power, low fluid resistance operation. More specifically, each valve 46 is an adaptation of highly efficient valves used in medical applications such as MEMS (micro electromechanical system) type or piezoelectric actuated valves. The bodies and valve seats of such designs are easily moldable with and can be integrated as lightweight components within the manifold body or on a PC board. Individual valve bodies can be designed for stacking assembly to form the manifold of this invention. In addition to a piezoelectric actuated valve other low energy actuatable valves are contemplated by the present invention including but not limited to electrically pulsed reed valves; valves having an actuator configured of nickel titanium alloy such as Nitinol; magnetic inductive type valves or fluidic control valves so long as low energy consumption will operate the valve in on-off positions in which the flow from an inlet to outlet will satisfy the flow requirements of the pressure adjusted air cells in a given pneumatic system for controlling a seating surface such as a seat, chair or bed to provide contouring, movement, support and/or comfort at a user interface. The importance of the use of such a valve arrangement in the present invention is that, in the past, pressure adjusted systems have utilized solenoid actuated valves to open and close an air cell to a pressure source for inflating the air cell or to a relief path for deflating the air cell. In such applications, the size of the control package is difficult to contain within the confines of a vehicle seat structure. Furthermore, power consumption is a problem since the major power consumers in the system combine power flow for operation of a motor driven pump and the power flow for operating the solenoids connected to the mechanical valve components.

Also, another advantage of reduced power is where power consumption is a rigid design constraint, as in the case of battery powered systems. The orders of magnitude decrease in valve power consumption provided by the present invention becomes a significant, and heretofore unrecognized advantage since a smaller power source can be used for lower cost and reduced weight; fewer modifications to wiring harness designs in vehicular operations are required and less heat is generated in systems where heat build up can be disadvantageous as for example in space shuttle and other vehicular operations where the system is used in a controlled environment.

Another feature of the valves 46 is that they have high flow rate capability that is important in applications where the air cell volume is relatively large, e.g., in the operation of the energy absorbing components of the system to be described. In such system the response is required to be non-subtle, e.g., pressure adjustments in the cell are made rapidly. In such applications the large flow rate is especially advantageous. However, in all applications, the flow rate will directly impact system energy dissipation. The activation time (time required for the system to reach a desired programmed target) will depend upon the flow rate of the valves, pump flow rate capacity, and volume of the target air cell(s). If the flow rate of an individual valve is low, more time will be required to achieve the target; a pump will be required to run for a longer period of time in which its power consumption over greater time will produce greater energy dissipation. Another disadvantage of such prior art lower flow rate valves is that they are pneumatically lousy since pressure drop across the valves will be higher and usable pressure at the outlet of the valve will be less.

The Control

The active parts of the system of this invention namely: the outlet valves 46, the pressure transducer 47, pump 52, as well as bleed valve 64 and supply valve 64 are interconnected electrically to the microcomputer unit 60 which controls the operation of the system. The microcomputer 60 can be a commercially available microcomputer such as the 68HCO5 variant manufactured by Motorola. A microcomputer as used herein includes all subsystems and peripheral components as is well known to those skilled in the art.

The microcomputer 60 has access to non-volatile memory, which has been programmed to provide a predetermined comfort standard such as the algorithm described in U.S. Pat. No. 5,283,735. These data can be compiled and coded for use with individual air cells or regions of air cells. Data sensed by transducer 47 is compared to the comfort standard and an actuation signal is generated which actuates the system to compensate for any differential between the programmed comfort level and the sensor generated data.

In order to operate each cell or group of cells independently to provide an extensively adjustable system, the microcomputer 60 must also be programmed to actuate the outlet valves 46 to isolate a selected air cell or group of air cells in communication with the manifold. The actuation is controlled in closed loop fashion to allow the pressure in the chamber 43 to equalize with the pressure in the air cell or cells with which it is communicating. On an instantaneous basis there is a closed system among the connected air cell(s), the feed tube 68, the chamber 43, and the fluid supply thereby allowing the sensor 47 to provide data from the closed system and to provide adjustment of the pressure in the isolated air cell(s) by the microcomputer 66 to the desired comfort or pressure level.

Operation

Figure 7:
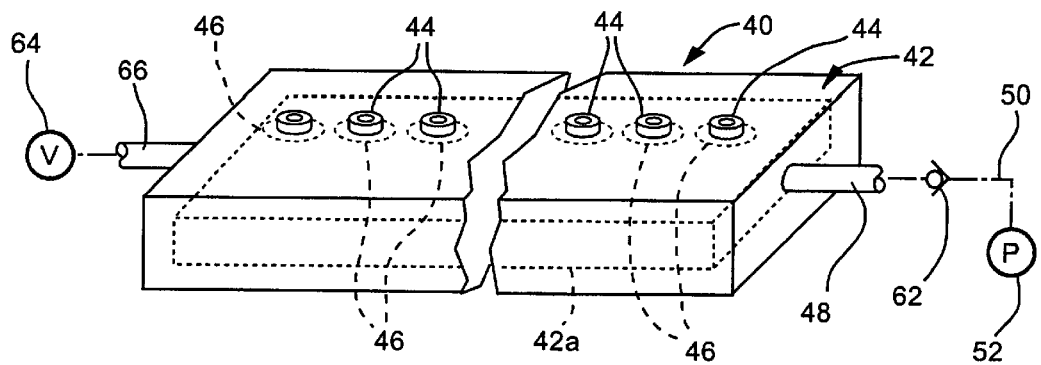
FIG. 7 is a view of a control valve for the embodiments shown in FIGS. 1–5.
Figure 9:
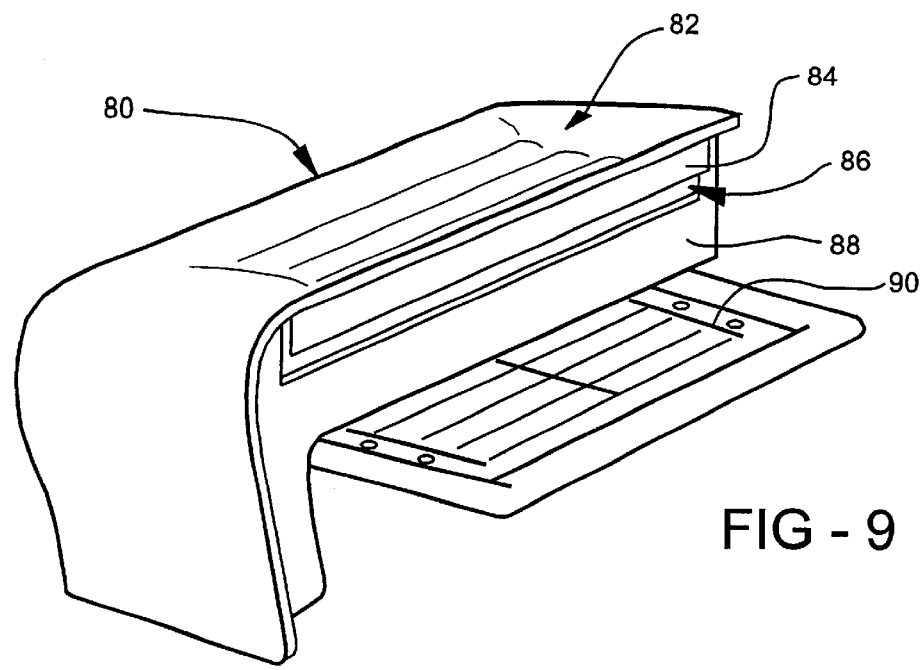
FIG. 9 is a perspective view exploded to show another embodiment of the invention in a seating application.
Figure 10:
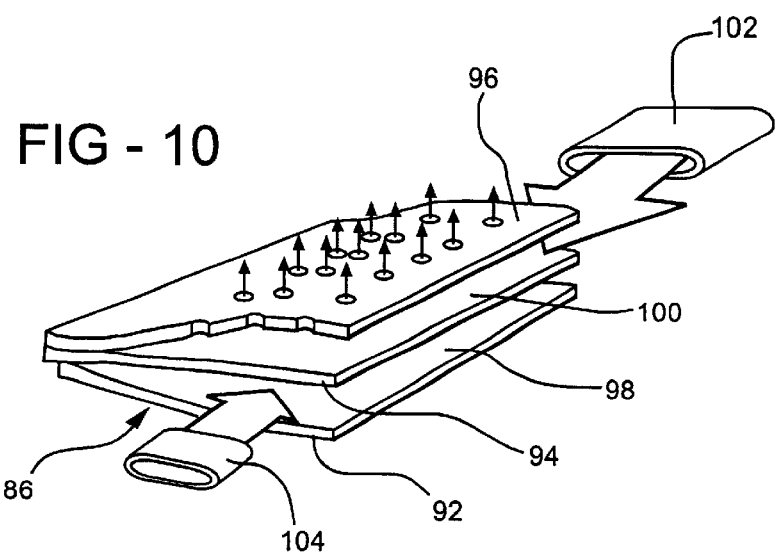
FIG. 10 is an enlarged fragmentary view in perspective of another embodiment of an air cell including the present invention.
Figure 11:
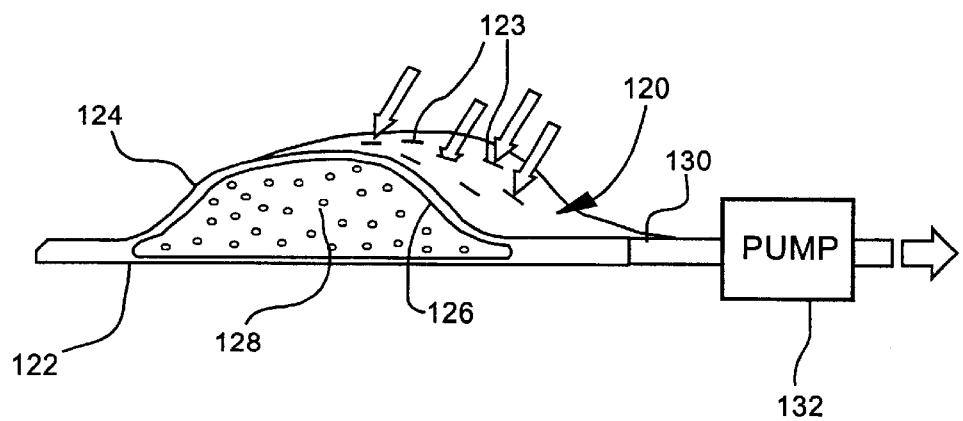
FIG. 11 is a perspective view partially section of another embodiment of a ventilating and load support air cell.
Figure 12:
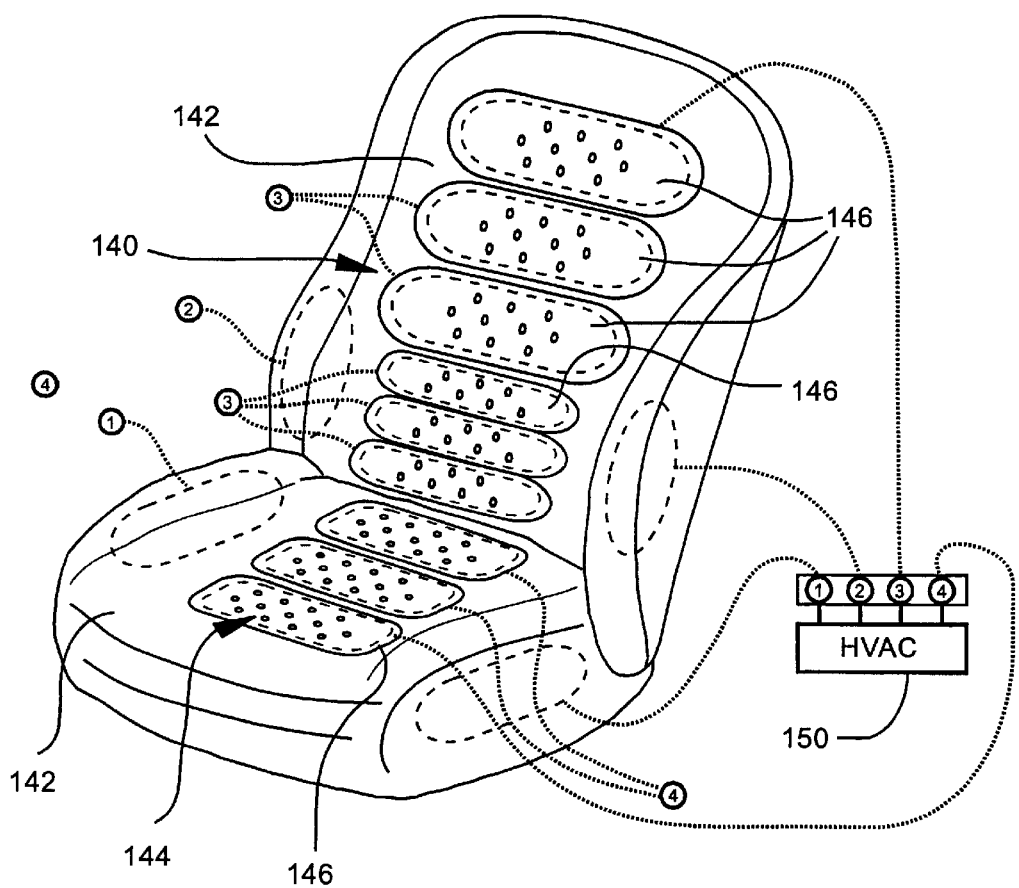
FIG. 12 is a diagrammatic view of still another embodiment.

The operation of the invention will be understood to have application to either the embodiment of FIGS. 1 and 2; the embodiment of FIGS. 3 and 4; the embodiment of FIGS. 5 and 6; the embodiment of FIGS. 9 and 10 and the embodiments of FIGS. 11 and 12, respectively, either described or to be described herein. The controller furthermore can be manual embodying a pump and switch or embody the controllers shown in FIG. 6 and in FIG. 7 of U.S. Ser. No. 8/808,511 U.S. Pat. No. 6,098,000 commonly owned by the assignee of the captioned invention and incorporated herein by reference. It should be understood that the operation of the target pressure control variants to be described herein apply equally well to systems in which the air cells can be independently positioned or remain in a predetermined position on a support surface of a vehicle seat or the like.

In operation, the microcomputer 60 will condition the valve drive 65 to in turn open a valve 46 interconnecting a selected air cell or air cell group, such as one or more of the ischial air cells 18, with the manifold chamber 22 and allow the pressure in the selected system to settle out. The time to let pressure equalize is "pressure settling time". After the settling time, the pressure is sensed and a signal is sent to the microcomputer 60 for comparison with the preprogrammed comfort data. The microcomputer 60 then generates a signal relative to the difference in the comfort level sensed to the programmed comfort level and initiates a flow of fluid to or from the selected cell system to reduce the difference to zero. This sequence of operations is then repeated "n" times until each of the air cell systems are sensed and adjusted.

The controller 60 controls fluid flow from a pressure source that can be an electric motor driven pump such as pump 29 in the first embodiment and a source of pressurized conditioned fluid such as cooled air directed across a refrigerant coil 67 or other cold source or a source of heated pressurized air that is supplied by a pump and including suitable heat source such as an electric heater 69 for heating the fluid prior to passage through the air cells 18, 20, 21 in the embodiment of FIG. 1 or the air cells 30 and 31 in the embodiment of FIG. 3. The plurality of control valves 46 are operative to control the supply of pressurized fluid to each of the air cells to simultaneously inflate the air cells for comfort control and to provide for a flow of cooling air through either the slits or holes for cooling the respective seating or support surfaces.

While the control valves 46 can be under the control of a suitably programmed microprocessor it will be understood by those skilled in the art that the control valves could constitute one or more manually actuated control valves. Still another arrangement could use the pump, operative alone, as the control of pressure in one more air cells.

In the aforesaid arrangements the pump for a system that supplies perforated cells for ventilating and supporting an occupant must be properly sized to supply adequate pressure and flow to both keep the air cell inflated to its desired occupant support pressure while preventing excessive air flow therefrom. A desired balance is to provide enough air for cooling or heating without having to expend excessive energy in the pumping process.

In one working embodiment that is only illustrative, the perforated layer of an air cell was selected having a thickness of 0.010 inches; and perforations of 0.045 inch holes and a the air flow is provided by a blower (pump) having a capacity of 2–30 cfm.

In other arrangements the parameters for design typically might include the following:

| Component | Design Parameter |
| --- | --- |
| Air cell bladder | TPU (Thermoplastic Urethane) .010" to .025" (Equivalent materials include PVC, Nylon or Thermoplastic Elastomers with or without fabric reinforcement and carbon filled TPU film) |
| Hole Size | .010"–.050" and spaced approximately 1 inch on centers or sufficient to allow 15–25 cfm airflow. |

Other Embodiments

In the embodiment of FIGS. 5 and 6 a separately inflated ventilation duct 70 is provided that is interposed between inflatable air cells divided into air cells 71, 72, 73, 74, and 75, respectively providing adjustable pneumatic support at lumbar zones 71, 72, 73 and at ischial zones 74 while air cells 75 provide thigh support. The air duct 70 is formed of an imperforate wall 76 and a perforated wall 77 and is positioned between the air cells 71–77 in. low/no pressure regions of body contact, and therefore, remain open to air circulation and movement of an occupant. The duct 70 can be formed separately but as part of a normal mat welding process wherein the sheets are joined by known methods to form the respective air cells. It is possible, however, to make a mat with or without the duct. The duct 70 is supplied from a suitable conditioned air source 79 and the other air cells are pressure controlled for occupant comfort as discussed in the previous embodiments.

In the embodiment of FIGS. 9 and 10 a vehicle seat 80 is shown including a perforated trim cover 82 covering a porous foam pad 84 for distributing air from a three ply pressure support and air flow air cell 86. The seat 80 further includes a seat form 88 and a suspension and frame 90 that can be configured as set-forth in copending U.S. Ser. No. 09/076,184 U.S. Pat. No. 6,070,942 filed May 12, 1998 for Seating Assembly and Method of Making Same and incorporated herein by reference. In this embodiment, as best shown in 10, each air cell 86 includes three walls 92, 94 and 96. The lower walls 92, 94 are imperforate and are supplied by a tube connected to one of the control valves described above for providing a predetermined occupant support pressure within a chamber 98 defined within the lower walls 92, 94. The uppermost wall 96 cooperates with the wall 94 to define a fluid cavity 100 that is communicated with a suitable source of conditioned fluid 102 such as the source of fluid 39 supplied to the chamber enclosing heater 47 or cold source 49 (or ambient air) shown in the embodiment of FIG. 4. Likewise the chamber 98 can be supplied by an independent pressure source 104 such as the pressure source 38 shown in FIG. 4.

In the embodiment shown in FIG. 11 an air cell 120 is illustrate that includes two walls 122, 124 forming a chamber 126 there between occupied by a filling of reticulated foam 128. In this embodiment the upper wall 122 is perforated at 123 as previously described and the chamber 126 is connected to a tube 130 for supply fluid to the chamber 126 for providing both occupant support and a flow of air through the seating surfaces to simultaneously heat, cool or condition the occupant supported by the pressure in the chamber 126. The provision of the reticulated foam 128 has a resiliency selected to provide a secondary occupant support when the chamber 126 is deflated. Furthermore, such reticulated foam 128 will maintain the perforations 123 open to assure fluid flow there through. If desired the cooling action can be obtained by providing a suction pump 132 connected to the tube 130 for drawing heated or cooled air from the interior of a vehicle that either has ambient air or heated or cooled air as supplied by a known HVAC (heating, ventilating and air conditioning) system that will act as a source of either cooling or heating fluid or vent air. In this case the suction pump 132 can be controlled by suitable valves in accordance with a desired support or cooling program. The invention also contemplates the option of a 3 layered cell, top one perforated and reticulated foam between the top 2 layers.

In the embodiment of FIG. 12 a support and air conditioning system 140 is shown wherein the conditioned air is discharged from the surface 142 of a occupant support system 144 of an air cell 146 that is connected directly to the outlet of an HVAC system 150 by suitable conduits 152.

The disclosed embodiments are representative of a presently preferred form of the invention, but is intended to be illustrative rather than definitive thereof. The invention is defined in the claims.

What is claimed is:

1. An inflatable air cell system for supporting and thermally conditioning the support for an occupant, the system including:

an air cell including two facing layers of flexible cell material, an upper layer of the two facing layers being configured to support an occupant and a lower layer of the two facing layers being sealed against airflow;

an air tube connected to said air cell to provide an opening into said air cell;

a pressure adjusting control system connected to the air tube;

perforations formed through said upper layer of the air cell to provide air flow with respect to the air cell for thermally conditioning an outer body-contacting surface of the upper layer.

2. The inflatable air cell system of claim 1 wherein:

said upper layer is configured to conform to an occupant supported against the upper layer; and said perforations are configured to leak air through the upper layer of the seat so as to combine both a pressure adjusted shape to that of an occupant body part while directing conditioned air against such supported body part of an occupant so as to optimize both support and heating/cooling of the occupant.

3. The inflatable air cell system of claim 1 wherein said multiple layer air cell includes two imperforate lower layers that are sealed against airflow and a third top perforated layer.

4. The inflatable air cell system of claim 1 wherein:

preselected air cells are formed from all imperforate multiple layers; and separate cells have a perforated layer to provide separate thermal conditioning of an occupant support.

5. The inflatable air cell system of claim 1 wherein:

said air cell has a combined support and conditioning capability; and said air cell is filled with reticulated foam to provide secondary support.

6. The inflatable air cell system of claim 1 wherein:

a first pumping system provides the pressure for occupant support; and a second pumping system provides the fluid flow for heating and cooling.

7. The inflatable air cell system of claim 1 further including a support and conditioning system wherein the conditioned air is drawn from the upper layer of the seat system for causing the air conditioning to be provided by surrounding ambient air.

8. The inflatable air cell system of claim 1 wherein the system includes an HVAC outlet that discharges conditioned air through the upper layer of the seat system.

* * * * *